(12) United States Patent
Robinson et al.

(10) Patent No.: US 11,725,460 B2
(45) Date of Patent: Aug. 15, 2023

(54) FLEXIBLE FRACTURING FLUID DELIVERY CONDUIT QUICK CONNECTORS

(71) Applicant: Cameron International Corporation, Houston, TX (US)

(72) Inventors: Stuart Robinson, Katy, TX (US);
James Ekdahl, Katy, TX (US);
Andrew Sanders, Pearland, TX (US);
Dennis P. Nguyen, Pearland, TX (US);
Kirk P. Guidry, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 17/734,753

(22) Filed: May 2, 2022

(65) Prior Publication Data

US 2022/0381124 A1    Dec. 1, 2022

Related U.S. Application Data

(62) Division of application No. 16/727,789, filed on Dec. 26, 2019, now Pat. No. 11,319,757.

(51) Int. Cl.
*E21B 17/02* (2006.01)
*F16L 37/086* (2006.01)
(Continued)

(52) U.S. Cl.
CPC .............. *E21B 17/02* (2013.01); *E21B 33/04* (2013.01); *E21B 33/068* (2013.01); *E21B 43/26* (2013.01);
(Continued)

(58) Field of Classification Search
CPC ........ E21B 17/02; E21B 33/04; E21B 33/068; E21B 43/26; E21B 43/2607; F16L 37/086; F16L 37/62
See application file for complete search history.

(56) References Cited

U.S. PATENT DOCUMENTS 1,051,046 A    1/1913   Witzenmann
1,329,760 A    2/1920   Fulton
(Continued)

FOREIGN PATENT DOCUMENTS

CA         2178856 A1      12/1997
CN       209817989 U       12/2019
(Continued)

OTHER PUBLICATIONS

Texas Oil Tools: Well Intervention Equipment brochure, 2016, National Oilwell Varco, Houston, Texas, United States of America (15 pages).
(Continued)

*Primary Examiner* — James G Sayre
(74) *Attorney, Agent, or Firm* — Eubanks PLLC

(57) ABSTRACT

Fracturing fluid delivery systems having flexible fracturing fluid delivery conduits secured with quick connectors are provided. In one example, a fracturing system includes a wellhead assembly and a fracturing fluid conduit coupled to the wellhead assembly to route fracturing fluid to the wellhead assembly. The fracturing fluid conduit includes a flexible body defining a bore for conveying the fracturing fluid to the wellhead assembly. The fracturing fluid conduit is coupled to the wellhead assembly via an actuated connector including one or more locking members that move from an unlocked position to a locked position to secure the fracturing fluid conduit to the wellhead assembly. Additional systems, devices, and methods are also disclosed.

12 Claims, 10 Drawing Sheets

(51) Int. Cl.
*E21B 43/26* (2006.01)
*E21B 33/068* (2006.01)
*E21B 33/04* (2006.01)

(52) U.S. Cl.
CPC ........ *E21B 43/2607* (2020.05); *F16L 37/086* (2013.01)

(56) References Cited

U.S. PATENT DOCUMENTS

| | | |
|---|---|---|
| 1,615,536 A | 1/1927 | Del Mar |
| 2,556,544 A | 6/1951 | Johnson |
| 2,934,095 A | 4/1960 | Lockhart |
| 3,118,691 A | 1/1964 | Press |
| 3,233,668 A | 2/1966 | Hamilton et al. |
| 3,306,637 A | 2/1967 | Press et al. |
| 3,393,267 A | 7/1968 | Busse |
| 3,508,768 A | 4/1970 | Hogan |
| 3,581,775 A | 6/1971 | Dahl |
| 3,934,902 A | 1/1976 | McNamee |
| 3,993,100 A | 11/1976 | Pollard et al. |
| 4,355,961 A | 10/1982 | Riggs |
| 4,366,864 A | 1/1983 | Gibson et al. |
| 4,383,554 A | 5/1983 | Merriman |
| 4,385,018 A | 5/1983 | Kutnyak |
| 4,405,016 A | 9/1983 | Best |
| 4,437,691 A | 3/1984 | Laney |
| 4,452,312 A | 6/1984 | Roblin |
| 4,559,716 A | 12/1985 | Daughtry et al. |
| 4,566,168 A | 1/1986 | Stromberg |
| 4,570,673 A | 2/1986 | Kendrick et al. |
| 4,603,887 A | 8/1986 | Mayfield et al. |
| 4,632,432 A | 12/1986 | Reneau |
| 4,749,047 A | 6/1988 | Taylor |
| 4,767,136 A | 8/1988 | Lehmann |
| 4,805,430 A | 2/1989 | Schmitz et al. |
| 4,998,756 A | 3/1991 | Hart |
| 5,135,698 A | 8/1992 | Salama et al. |
| 5,158,326 A | 10/1992 | Anderson et al. |
| 5,195,589 A | 3/1993 | Mota et al. |
| 5,244,045 A | 9/1993 | Mota |
| 5,524,710 A | 6/1996 | Shinn |
| 5,636,691 A | 6/1997 | Hendrickson et al. |
| 5,927,344 A | 7/1999 | Nobileau |
| 6,003,604 A | 12/1999 | Wilkins |
| 6,004,639 A | 12/1999 | Quigley et al. |
| 6,006,788 A | 12/1999 | Jung et al. |
| 6,102,445 A | 8/2000 | Thomas |
| 6,192,941 B1 | 2/2001 | Mallen-Herrero et al. |
| 6,234,030 B1 | 5/2001 | Butler |
| 6,364,024 B1 | 4/2002 | Dallas |
| 6,609,734 B1 | 8/2003 | Baugh |
| 6,691,743 B2 | 2/2004 | Espinasse |
| 6,899,172 B2 | 5/2005 | McLeod et al. |
| 7,481,239 B2 | 1/2009 | McGuire et al. |
| 7,934,546 B2 | 5/2011 | McGuire et al. |
| 8,100,182 B2 | 1/2012 | Smith et al. |
| 8,110,741 B2 | 2/2012 | Brotzell et al. |
| 8,241,453 B2 | 8/2012 | Beteri et al. |
| 8,398,122 B2 | 3/2013 | Crompton et al. |
| 8,485,262 B1 | 7/2013 | Angers |
| 8,528,585 B2 | 9/2013 | McGuire |
| 8,770,277 B2 | 7/2014 | Artherholt |
| 8,839,867 B2 | 9/2014 | Conrad |
| 8,905,056 B2 | 12/2014 | Kendrick |
| 8,960,307 B2 | 2/2015 | Cain et al. |
| 8,978,763 B2 | 3/2015 | Guidry |
| 9,068,450 B2 | 6/2015 | Guidry |
| 9,175,556 B2 | 11/2015 | Cherewyk et al. |
| 9,222,345 B2 | 12/2015 | Conrad |
| 9,255,469 B2 | 2/2016 | Conrad |
| 9,518,430 B2 | 12/2016 | Guidry |
| 9,631,469 B2 | 4/2017 | Guidry et al. |
| 9,670,745 B1 | 6/2017 | Johansen et al. |
| 9,903,190 B2 | 2/2018 | Conrad et al. |
| 9,915,132 B2 | 3/2018 | Conrad |
| 9,932,800 B2 | 4/2018 | Guidry |
| 10,094,195 B2 | 10/2018 | Guidry |
| 10,132,146 B2 | 11/2018 | Guidry |
| 10,161,210 B2 | 12/2018 | Thornburrow |
| 10,323,475 B2 | 6/2019 | Christopherson et al. |
| 10,385,643 B2 | 8/2019 | Guidry |
| 10,385,645 B2 | 8/2019 | Guidry |
| 10,385,662 B2 | 8/2019 | Conrad |
| 10,400,538 B2 | 9/2019 | Roesner |
| 10,443,763 B2 | 10/2019 | Green et al. |
| 10,480,300 B2 | 11/2019 | Guidry |
| 10,487,637 B2 | 11/2019 | Guidry et al. |
| 11,319,757 B2 | 5/2022 | Robinson et al. |
| 2003/0205378 A1 | 11/2003 | Wellington et al. |
| 2003/0205385 A1 | 11/2003 | Duhn et al. |
| 2004/0251020 A1 | 12/2004 | Smith |
| 2006/0207763 A1 | 9/2006 | Hofman |
| 2007/0125544 A1 | 6/2007 | Robinson et al. |
| 2007/0227722 A1 | 10/2007 | Atencio |
| 2008/0083539 A1 | 4/2008 | Hickie |
| 2008/0277120 A1 | 11/2008 | Hickie |
| 2009/0014184 A1 | 1/2009 | Voss et al. |
| 2009/0090515 A1 | 4/2009 | Chan et al. |
| 2009/0145597 A1 | 6/2009 | Cherewyk |
| 2009/0261575 A1 | 10/2009 | Bull et al. |
| 2010/0032031 A1 | 2/2010 | Neal |
| 2010/0051261 A1 | 3/2010 | Koleilat et al. |
| 2010/0230114 A1 | 9/2010 | Jennings |
| 2010/0300672 A1 | 12/2010 | Childress et al. |
| 2011/0030963 A1 | 2/2011 | Demong et al. |
| 2011/0079399 A1 | 4/2011 | Nguyen et al. |
| 2011/0108275 A1 | 5/2011 | Borak et al. |
| 2011/0114320 A1 | 5/2011 | Sponchia et al. |
| 2011/0132596 A1 | 6/2011 | Yeh et al. |
| 2011/0259584 A1 | 10/2011 | Broussard, II |
| 2012/0152564 A1 | 6/2012 | Peltier |
| 2012/0155813 A1 | 6/2012 | Quigley et al. |
| 2012/0181015 A1 | 7/2012 | Kajaria et al. |
| 2012/0181016 A1 | 7/2012 | Kajaria et al. |
| 2012/0181030 A1 | 7/2012 | Kajaria et al. |
| 2012/0227814 A1* | 9/2012 | Kendrick ................ F16L 23/08 137/1 |
| 2012/0242081 A1 | 9/2012 | Keays et al. |
| 2013/0284455 A1 | 10/2013 | Kajaria et al. |
| 2014/0007970 A1 | 1/2014 | Dodds |
| 2014/0238683 A1 | 8/2014 | Korach et al. |
| 2015/0083426 A1 | 3/2015 | Lesko et al. |
| 2015/0159458 A1 | 6/2015 | Tan et al. |
| 2015/0211342 A1 | 7/2015 | Shaw et al. |
| 2015/0275629 A1 | 10/2015 | Hatton |
| 2015/0345272 A1 | 12/2015 | Kajaria et al. |
| 2015/0354313 A1 | 12/2015 | McClinton et al. |
| 2016/0186506 A1 | 6/2016 | Sha et al. |
| 2016/0305515 A1 | 10/2016 | Leffer et al. |
| 2016/0363242 A1 | 12/2016 | De Nora |
| 2017/0175905 A1 | 6/2017 | Martino et al. |
| 2017/0298700 A1 | 10/2017 | Robichaux et al. |
| 2018/0264604 A1 | 9/2018 | Baugh et al. |
| 2018/0291718 A1 | 10/2018 | Conrad et al. |
| 2019/0360624 A1* | 11/2019 | Waller .................... E21B 17/02 |
| 2020/0088021 A1 | 3/2020 | Guidry |
| 2020/0115983 A1* | 4/2020 | Nanney ............... E21B 43/2607 |
| 2020/0131877 A1 | 4/2020 | Guidry |
| 2020/0131889 A1 | 4/2020 | Robinson et al. |
| 2020/0277845 A1* | 9/2020 | Kajaria .................. E21B 43/26 |
| 2021/0010358 A1 | 1/2021 | Guidry et al. |

FOREIGN PATENT DOCUMENTS

| | | |
|---|---|---|
| EP | 0670413 B1 | 12/1998 |
| EP | 1101997 A1 | 5/2001 |

OTHER PUBLICATIONS

Hydraulic Latch Assembly, webpage available at https://www.f-e-t.com/products/completions/well-intervention/pressure-control-

(56) References Cited

OTHER PUBLICATIONS equipment/hydraulic-latch-assembly on Jan. 19, 2019, Forum Energy Technologies, Houston, Texas, United States of America (4 pages).

* cited by examiner

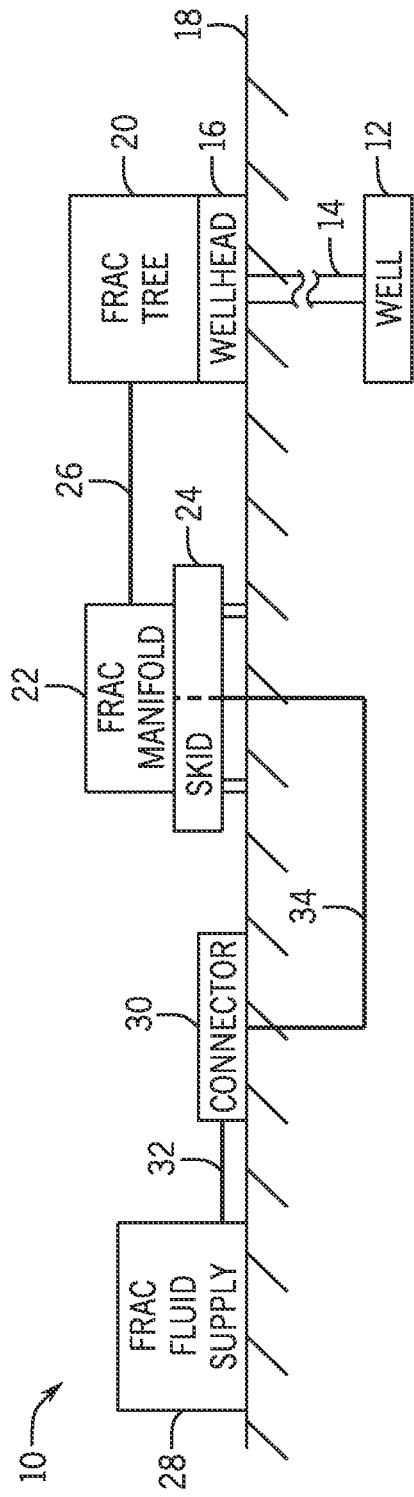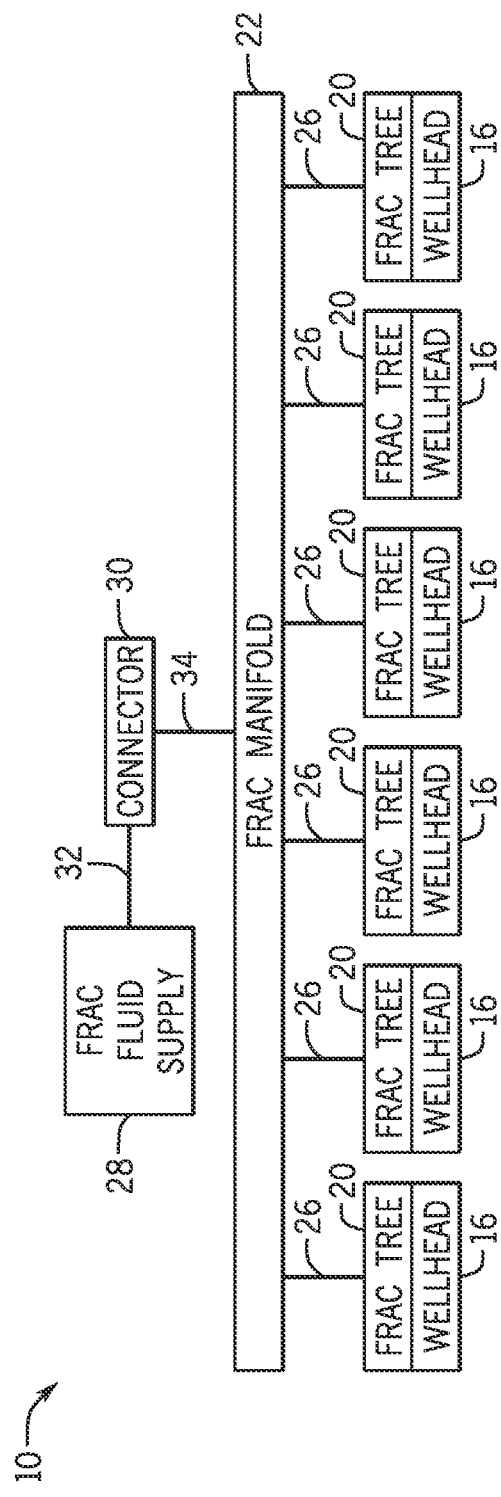

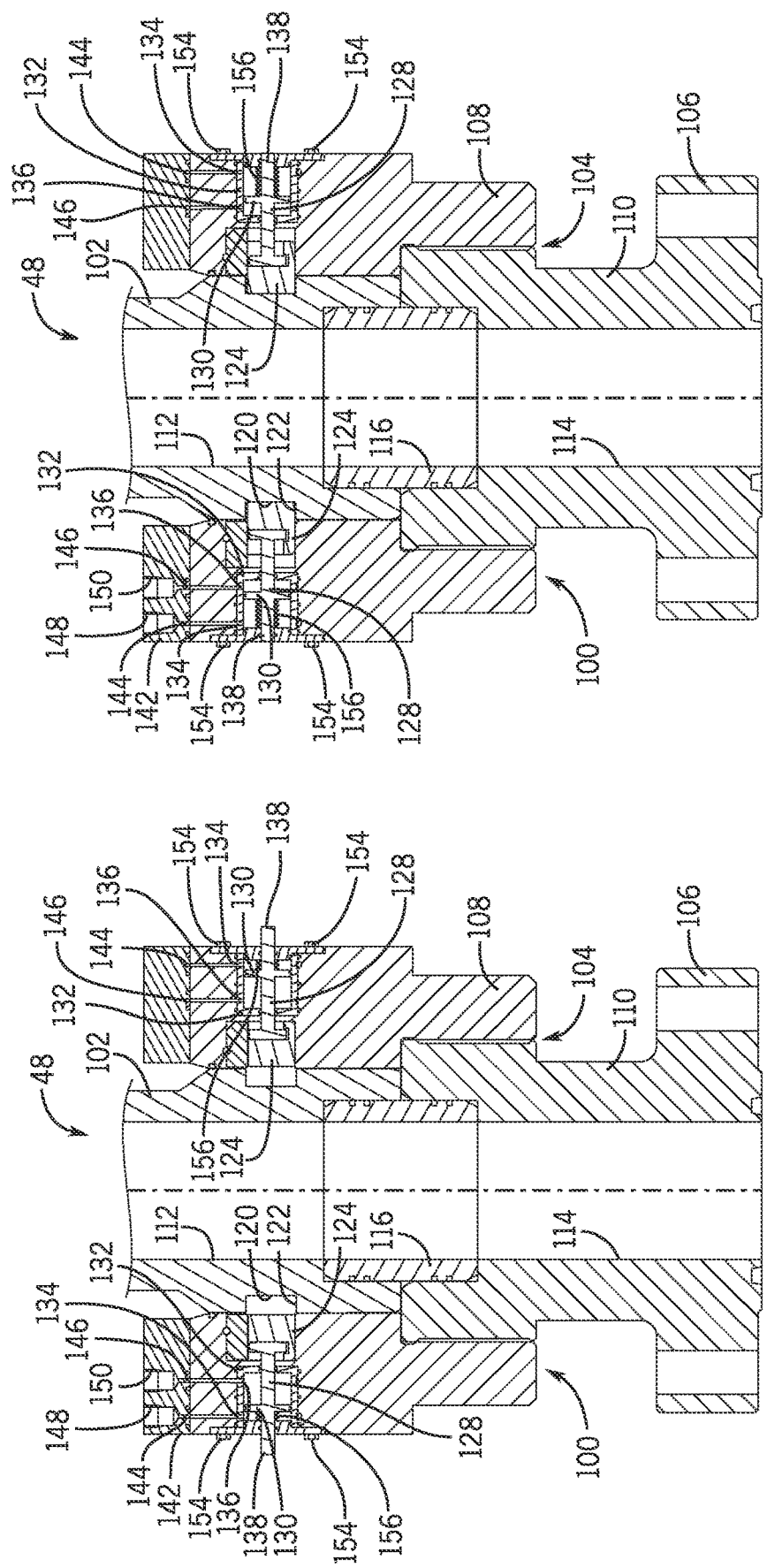

FLEXIBLE FRACTURING FLUID DELIVERY CONDUIT QUICK CONNECTORS

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource is discovered, drilling and production systems are often employed to access and extract the resource. These systems may be located onshore or offshore depending on the location of a desired resource. Further, such systems generally include a wellhead assembly through which the resource is extracted. These wellhead assemblies may include a wide variety of components, such as various casings, valves, fluid conduits, and the like, that control drilling or extraction operations.

Additionally, such wellhead assemblies may use a fracturing tree and other components to facilitate a fracturing process and enhance production from a well. As will be appreciated, resources such as oil and natural gas are generally extracted from fissures or other cavities formed in various subterranean rock formations or strata. To facilitate extraction of such resources, a well may be subjected to a fracturing process that creates one or more man-made fractures in a rock formation. This facilitates, for example, coupling of pre-existing fissures and cavities, allowing oil, gas, or the like to flow into the wellbore. Such fracturing processes typically include injecting a fracturing fluid—which is often a mixture including sand and water—into the well to increase the well's pressure and form the man-made fractures. A fracturing manifold may provide fracturing fluid to one or more fracturing trees via fracturing lines (e.g., pipes).

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Some embodiments of the present disclosure generally relate to fracturing fluid delivery systems. More specifically, some embodiments relate to fracturing systems having flexible fracturing fluid delivery conduits coupled with quick connectors between a fracturing manifold and wellhead assemblies. In certain embodiments, ends of flexible fracturing fluid conduits are received in and secured by actuated quick connectors to facilitate installation of the flexile fracturing fluid conduits in a fracturing system. The quick connectors can have locking members, such as lock rings, locking segments, or jaws, that are actuated between unlocked and locked positions for selectively securing ends of the flexible fracturing fluid conduits.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 1 generally depicts a fracturing system in accordance with an embodiment of the present disclosure;

FIG. 2 is a diagram of the fracturing system of FIG. 1 with a fracturing manifold coupled to multiple fracturing trees in accordance with one embodiment;

FIG. 9 is a section view of a quick connector in an unlocked state having locking segments driven by actuation cylinders fastened in a body of the quick connector in accordance with one embodiment;

FIG. 10 is a section view of the quick connector of FIG. 9 in a locked state;

DETAILED DESCRIPTION OF SPECIFIC EMBODIMENTS

Figure 3:
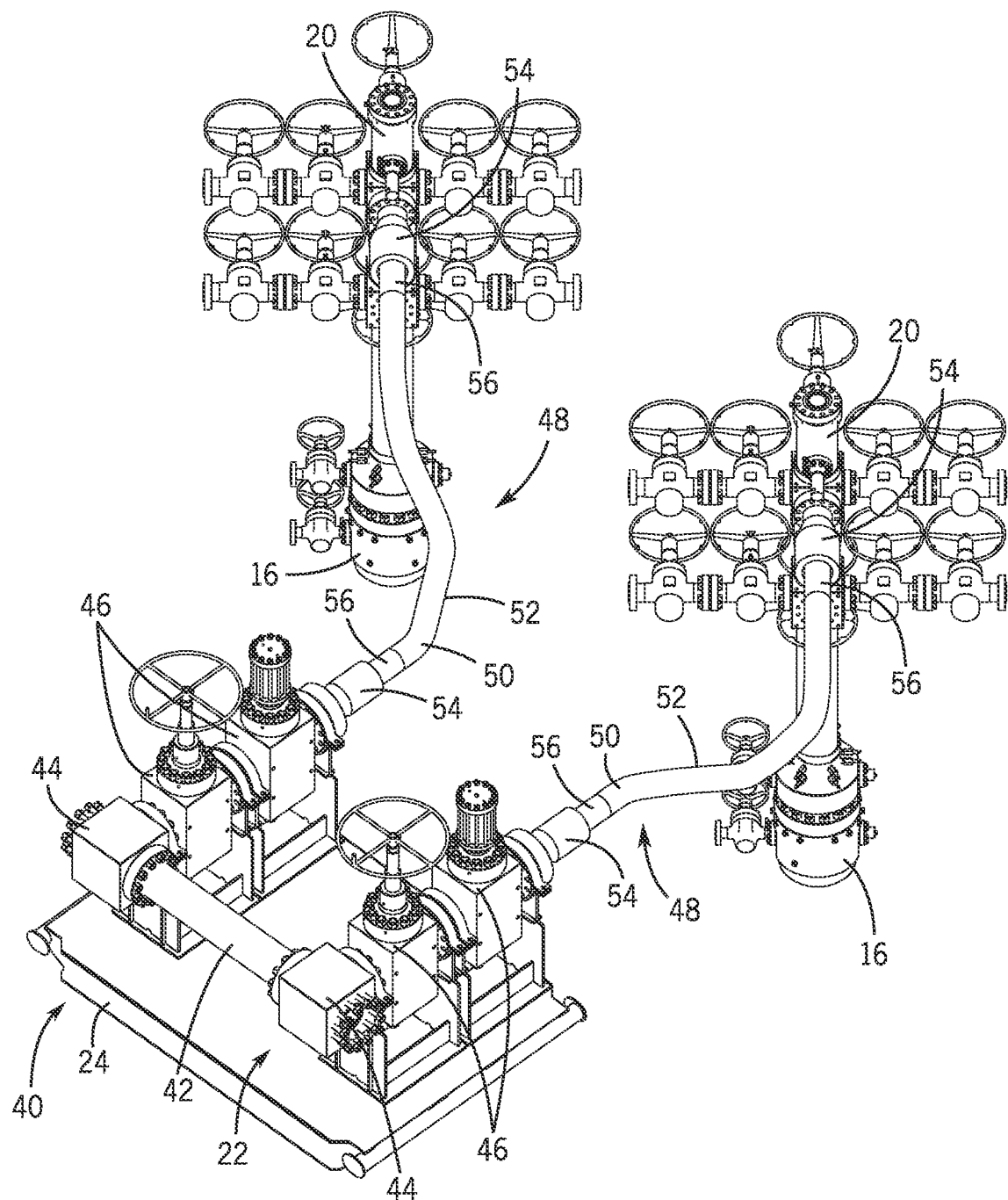
FIG. 3 is a perspective view of certain components of a fracturing system, including a portion of the fracturing manifold mounted on a skid and joined to fracturing trees with fracturing fluid conduits and quick connectors, in accordance with one embodiment.

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Turning now to the present figures, an example of a fracturing system 10 is provided in FIGS. 1 and 2 in accordance with one embodiment. The fracturing system 10 facilitates extraction of natural resources, such as oil or natural gas, from a well 12 via a wellbore 14 and a wellhead 16. Particularly, by injecting a fracturing fluid into the well 12, the fracturing system 10 increases the number or size of fractures in a rock formation or strata to enhance recovery of natural resources present in the formation. In the presently illustrated embodiment, the well 12 is a surface well accessed by equipment of wellhead 16 installed at surface level (i.e., on ground 18). But it will be appreciated that natural resources may be extracted from other wells, such as platform or subsea wells.

The fracturing system 10 includes various components to control flow of a fracturing fluid into the well 12. For instance, the depicted fracturing system 10 includes a fracturing tree 20 and a fracturing manifold 22. In at least some embodiments, the fracturing tree 20 includes at least one valve that controls flow of the fracturing fluid into the wellhead 16 and, subsequently, into the well 12. Similarly, the fracturing manifold 22 may include at least one valve that controls flow of the fracturing fluid to the fracturing tree 20 by a conduit or fluid connection 26, such as one or more pipes.

The fracturing manifold 22 is mounted on at least one skid 24 (e.g., a platform mounted on rails) to facilitate movement of the fracturing manifold 22 with respect to the ground 18. As depicted in FIG. 2, the fracturing manifold 22 is connected to provide fracturing fluid to multiple fracturing trees 20 and wellheads 16. But it is noted that the fracturing manifold 22 may instead be coupled to a single fracturing tree 20 in full accordance with the present techniques. In one embodiment in which the fracturing manifold 22 is coupled to multiple fracturing trees 20, various valves of the fracturing manifold 22 may be mounted on separate skids 24 to enable variation in the spacing between the valves.

Fracturing fluid from a supply 28 is provided to the fracturing manifold 22. In FIG. 1, a connector 30 receives fracturing fluid from the supply 28 through a conduit or fluid connection 32, such as pipes or hoses, and then transmits the fluid to the fracturing manifold 22 by way of a subterranean conduit or fluid connection 34. The fracturing fluid could be routed from the supply 28 to the fracturing manifold 22 entirely above ground without use of a subterranean conduit 34 in other instances. In one embodiment, the fracturing fluid supply 28 is provided by one or more trucks that deliver the fracturing fluid, connect to the connector 30, and pump the fluid into the fracturing manifold 22 via the connector 30 and connections 32 and 34. In another embodiment, the fracturing fluid supply 28 is in the form of a reservoir from which fluid may be pumped into the fracturing manifold 22. But any other suitable sources of fracturing fluid and manners of transmitting such fluid to the fracturing manifold may instead be used.

In at least some embodiments, fracturing fluid is routed to wellhead assemblies through fluid connections 26 having flexible lines. One such example is generally depicted in FIG. 3 as having a skid-mounted assembly 40 of the fracturing manifold 22 coupled to a pair of fracturing trees 20 by fluid conduits 48. The assembly 40 includes a pipe 42 spanning connection blocks 44. The pipe 42 and the connection blocks 44 are part of a trunk line of the manifold 22 for routing fracturing fluid to be delivered to multiple fracturing trees, and it will be appreciated that other pipes or conduits can be coupled to the connection blocks 44 to join other portions of the trunk line (e.g., to other skid-mounted assemblies 40, which can be coupled to additional fracturing trees 20).

Valves 46 enable individual control of the flow of fracturing fluid from the trunk line to each fracturing tree 20 through the fluid conduits 48. The valves 46 are depicted here as mounted on the skid 24 as part of the assembly 40 of the fracturing manifold 22. In other instances, valves 46 could also or instead be positioned elsewhere (e.g., at the other end of the fluid conduits 48) or omitted (in which case valves of the fracturing trees could be used to control flow of fracturing fluid from the manifold into the wells).

The fluid conduits 48 are each depicted in FIG. 3 as including a flexible pipe 50 (which may also be referred to as a flexible hose) coupled to route fracturing fluid from the manifold 22 to a fracturing tree 20 of a wellhead assembly. As depicted, the flexible pipe 50 includes a flexible body 52, which may be formed of a polymeric material (e.g., natural or synthetic rubber), a composite material (which may include a polymer), or some other suitable material. In at least some instances, the flexible body 52 is formed with polyetheretherketone (PEEK) or another polymer in the polyaryletherketone (PAEK) family. The inclusion of polymeric or composite materials in the flexible body 52 may reduce the weight of the conduit 48, as compared to a conduit formed entirely of iron or steel. Further, the flexibility provided by such materials allows the conduit 48 to be bent to allow an operator to more easily install the conduit 48 (such as between the fracturing manifold 22 and a fracturing tree 20) by allowing the profile of the conduit 48 to be changed to accommodate differences in spacing, elevation, and angular alignment between connection points for the ends of the conduit 48. In certain embodiments, the flexible pipe 50 has a reinforced flexible body 52, such as a wire-belted body. In some embodiments, such as that depicted in FIG. 3, a fluid pathway is provided from the manifold 22 to a given well through a single fluid conduit 48, such that all fracturing fluid pumped into the given well during a fracturing operation passes through that fluid conduit 48. But in other instances, multiple fluid conduits 48 (e.g., flexible pipes 50) may be connected in parallel to route fracturing fluid along multiple paths from a manifold 22 to a given well.

Fracturing fluid typically contains sand or other abrasive particulates that can erode conduits through which the fracturing fluid flows. In at least some embodiments, the flexible pipe 50 can include an inner liner within the body 52 to reduce erosive effects from flow of fracturing fluid or other abrasive fluids through the bore of the pipe 50. Such an inner liner may be, for example, a layer of rubber, a layer of some other polymeric or composite material, a wire mesh liner, or a corrugated sleeve liner. During fluid flow through the pipe 50 (e.g., during a fracturing operation), a liner can reduce impingement of abrasive particulates on the inner surface of the body 52 and, consequently, reduce erosive wear of the body 52. Although the pipe 50 may include a liner in some instances, it will be appreciated that the pipe 50 could be used without a liner in other embodiments.

The fluid conduits 48 can be connected between the fracturing manifold 22 and wellhead assemblies in various manners. The ends of the fluid conduits 48 depicted in FIG. 3, for instance, are connected to the fracturing trees 20 and the fracturing manifold 22 via quick connectors 54. These quick connectors 54 can take various forms, several of which are described below by way of example. In at least some embodiments, these quick connectors 54 are actuated connectors—connectors in which locking elements are operated via an actuator to secure or release the ends of the fluid conduits 48 to other equipment, such as a fracturing tree 20 and the fracturing manifold 22. Such actuated connectors are in contrast to hammer union connections, as well as to flanged connections in which opposing flanges are connected with fasteners (e.g., studs and nuts). Further, in at least some embodiments of the present technique, opposing ends of a fluid conduit 48 are connected to equipment (e.g., to a fracturing tree 20 and to the fracturing manifold 22) with actuated quick connectors 54 and the fluid conduit 48 is without a flanged connection or a hammer union between the opposing ends of the fluid conduit 48.

The actuated connectors 54 can be actuated electrically, hydraulically, pneumatically, magnetically, or in some other manner to secure an end of a fluid conduit 48. The connectors 54 can be remotely actuated in some cases, such as with electric or hydraulic power provided remotely (e.g., from an operator control panel) via cables or hoses to actuate the connectors 54. And the connectors 54 can be attached to other equipment (e.g., at a fluid port of a fracturing tree 20 or fracturing manifold 22) in any suitable fashion. In at least some embodiments, the connectors 54 include flanges (e.g., American Petroleum Institute (API) flanges) with mounting holes to facilitate connection to mating components. While connectors 54 are shown in FIG. 3 for connecting a single fluid conduit 48 from the fracturing manifold 22 to each wellhead assembly, in other instances connectors 54 may be used to connect multiple fluid conduits 48 from the fracturing manifold 22 to a wellhead assembly.

As depicted in FIG. 3, the flexible pipes 50 can include rigid ends 56 coupled to the flexible bodies 52 to facilitate installation. The quick connectors 54 and the rigid ends 56 can be formed with any suitable material, such as steel or another metal, and in any suitable manner. In some embodiments, the rigid ends 56 are formed as mandrels that facilitate coupling of the fluid conduits 48 to the fracturing trees 20 and the fracturing manifold 22 via quick connectors 54. The rigid ends 56 can be attached to or formed on the flexible bodies 52 in any suitable manner. Although the opposite ends of a flexible pipe 50 may include identical rigid ends 56, in other instances the opposite ends of a flexible pipe 50 may differ. The opposite ends may have different rigid ends 56 for connection to different forms of quick connectors 54, for example. As shown in FIG. 3, the fluid conduits 48 may generally be considered to be coupled to equipment via pin-and-box connections, in which pin ends (e.g., mandrels) of the fluid conduits 48 are received in box ends represented by the quick connectors 54 attached to the fracturing trees 20 and the fracturing manifold 22. In other embodiments, however, the box ends of the connections may be provided instead on the ends of the fluid conduits 48 with the pin ends (e.g., mandrels) provided on the fracturing trees 20 and the fracturing manifold 22.

Figure 5:
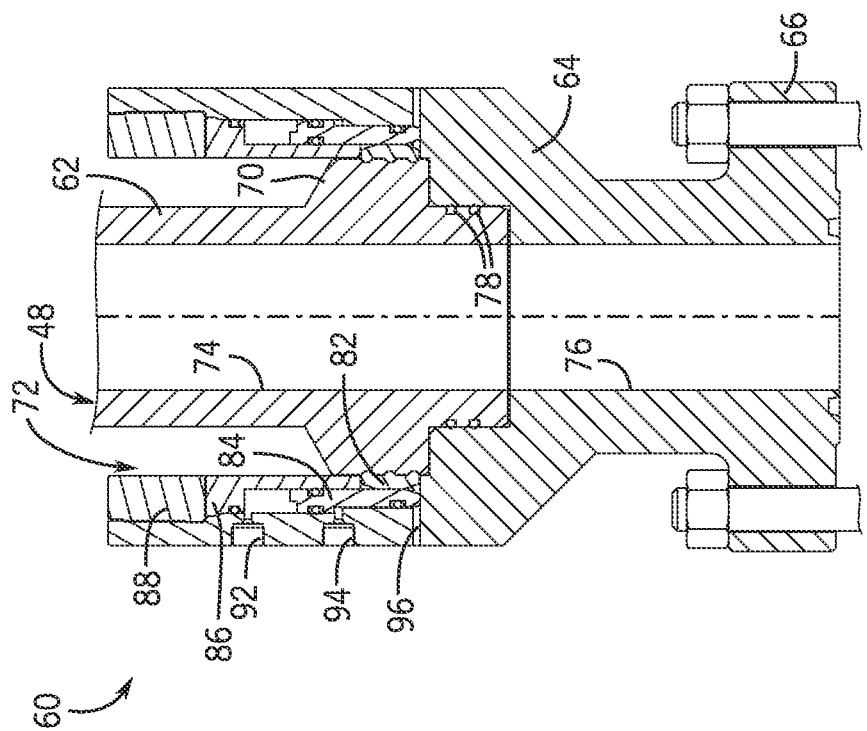
FIG. 5 is a section view of the quick connector of FIG. 4 in a locked state.
Figure 4:
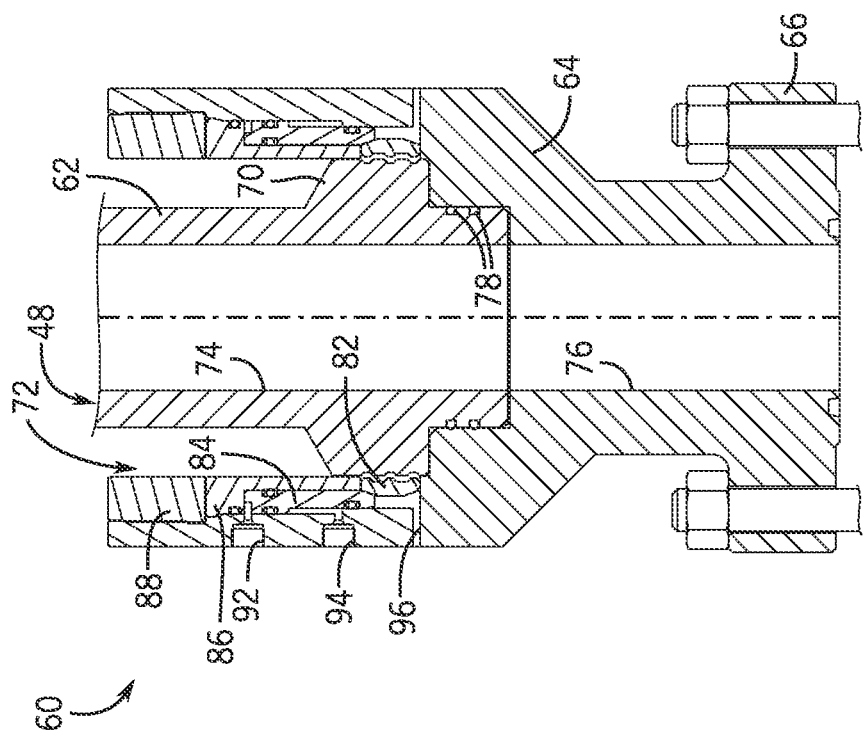
FIG. 4 is a section view of a quick connector in an unlocked state having a lock ring actuated with a piston for securing an end of a fluid conduit in accordance with one embodiment.

In some instances, one or more of the quick connectors 54 may be provided in the form of a piston-actuated quick connector 60, an example of which is illustrated in FIGS. 4 and 5. As presently shown, the quick connector 60 includes a receiving body 64 (e.g., a receptacle or box end), which receives and secures an end (e.g., pin end) of the fluid conduit 48, and a flange 66 for fastening the quick connector 60 to other equipment, such as a fracturing tree 20 or the fracturing manifold 22. More particularly, in this depicted embodiment the end of the fluid conduit 48 (e.g., the rigid end 56 of the flexible pipe 50) includes a mandrel 62 with a shoulder 70 received in a socket 72 of the receiving body 64. This allows fluid communication between bores 74 and 76 of the mandrel 62 and receiving body 64. Seals 78 (e.g., elastomer or metal seals) can be used between the mandrel 62 and the receiving body 64 to inhibit leakage from the bores 74 and 76 at the quick connector 60.

The quick connector 60 also includes a locking member, shown here as a lock ring 82, and an actuator 84. In some instances, the lock ring 82 is an outwardly biased lock ring (e.g., a C-ring or other split lock ring) and the actuator 84 is a piston. The lock ring 82 and the actuator 84 are shown in unlocked positions in FIG. 4 and in locked positions in FIG. 5. The actuator 84 is retained in the receiving body 64 by an enclosure ring 86 and a retaining ring 88. As shown in FIGS. 4 and 5, the enclosure ring 86 may be installed in the socket 72 to at least partially enclose the actuator 84, while the retaining ring 88 may be threaded into the socket 72 to retain the enclosure ring 86 and the actuator 84. Although presently depicted as separate rings, the enclosure ring 86 and the retaining ring 88 may be provided as a single integral unit in other embodiments.

During installation, with the end of a fracturing fluid conduit 48 (e.g., the mandrel 62) inserted into the socket 72 of the receiving body 64, the actuator 84 can be driven axially from its unlocked position of FIG. 4 to its locked position of FIG. 5. This drives the lock ring 82 radially inward into locking engagement with the shoulder 70 of the mandrel end 62 (i.e., from the unlocked position of the lock ring 82 in FIG. 4 to the locked position of the lock ring 82 in FIG. 5) to secure the fracturing fluid conduit 48 to the equipment (e.g., fracturing tree 20 or fracturing manifold 22) to which the receiving body 64 is connected.

In at least some embodiments, including that depicted in FIGS. 4 and 5, the actuator 84 is a piston actuated by a control fluid routed into the quick connector 60. The control fluid (e.g., hydraulic control fluid) can be pumped into the quick connector 60 through a lock port 92 to drive the actuator 84 to its locked position (FIG. 5) to push the lock ring 82 radially inward against the mandrel 62 and secure the fracturing fluid conduit 48 in the receiving body 64. To disconnect the fluid conduit 48, control fluid could instead be pumped through an unlock port 94 to return the actuator 84 to its unlocked position, allowing the lock ring 82 to radially expand out of engagement with the mandrel 62. The depicted quick connector 60 also includes a vent port 96 to facilitate movement of the actuator 84 during locking or unlocking of the connector 60. Also, various seals may be provided in the quick connector 60, such as between the receiving body 64, the actuator 84, and the enclosure ring 86, to prevent control fluid from leaking within the quick connector 60 (e.g., from lock and unlock chambers that receive control fluid via the ports 92 and 94).

The lock ring 82 and the mandrel 62 can include mating engagement features (e.g., ridges and grooves) to facilitate locking of the fluid conduit 48 within the receiving body 64. As shown in FIGS. 4 and 5, the mandrel 62 has a shoulder 70 with mating features for engaging the lock ring 82. In other embodiments, however, the lock ring 82 can close against some other surface of the mandrel 62. For example, the shoulder 70 could be omitted and the lock ring 82 closed against the exterior of the mandrel 62.

Figure 6:
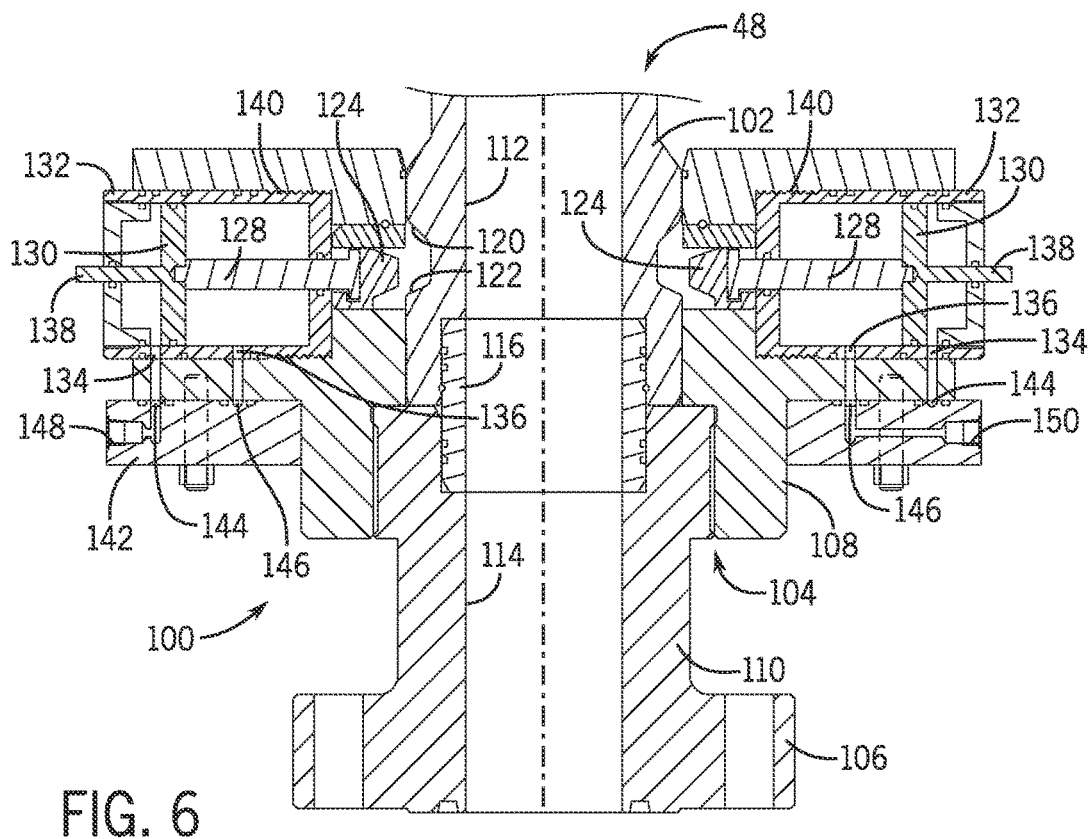
FIG. 6 is a section view of a quick connector in an unlocked state having locking segments driven by actuation cylinders in accordance with one embodiment.
Figure 7:
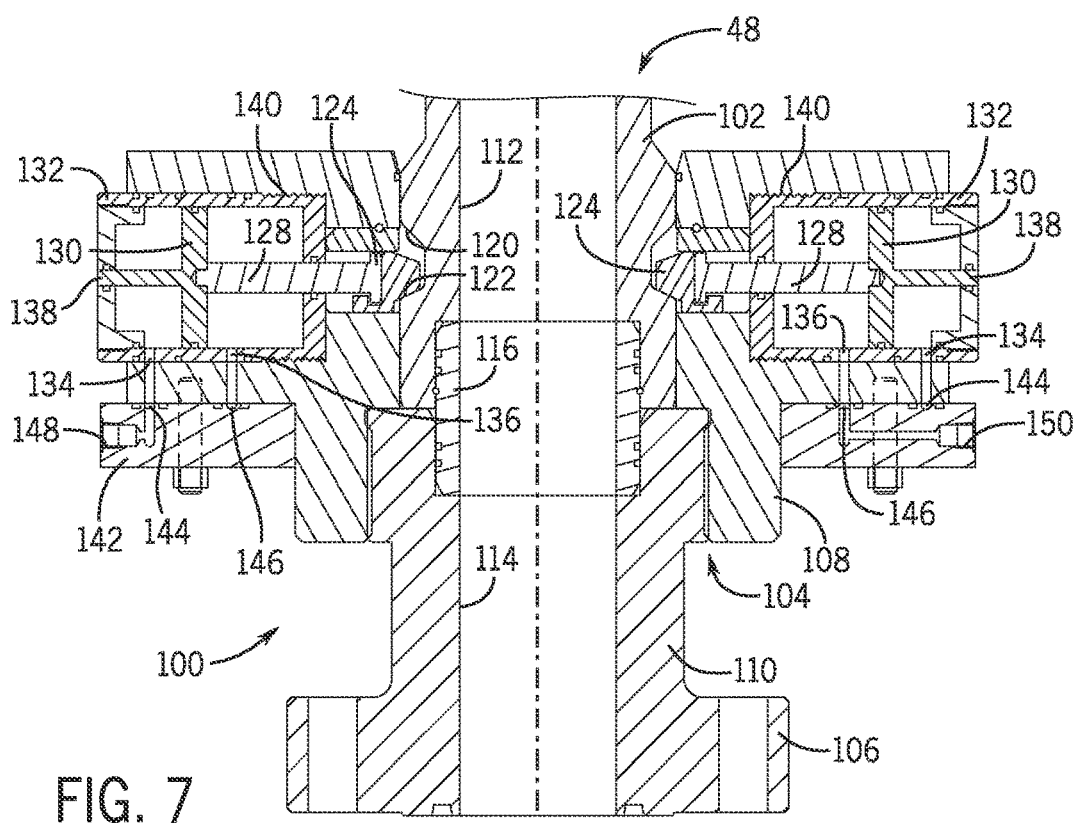
FIG. 7 is a section view of the quick connector of FIG. 6 in a locked state.
Figure 8:
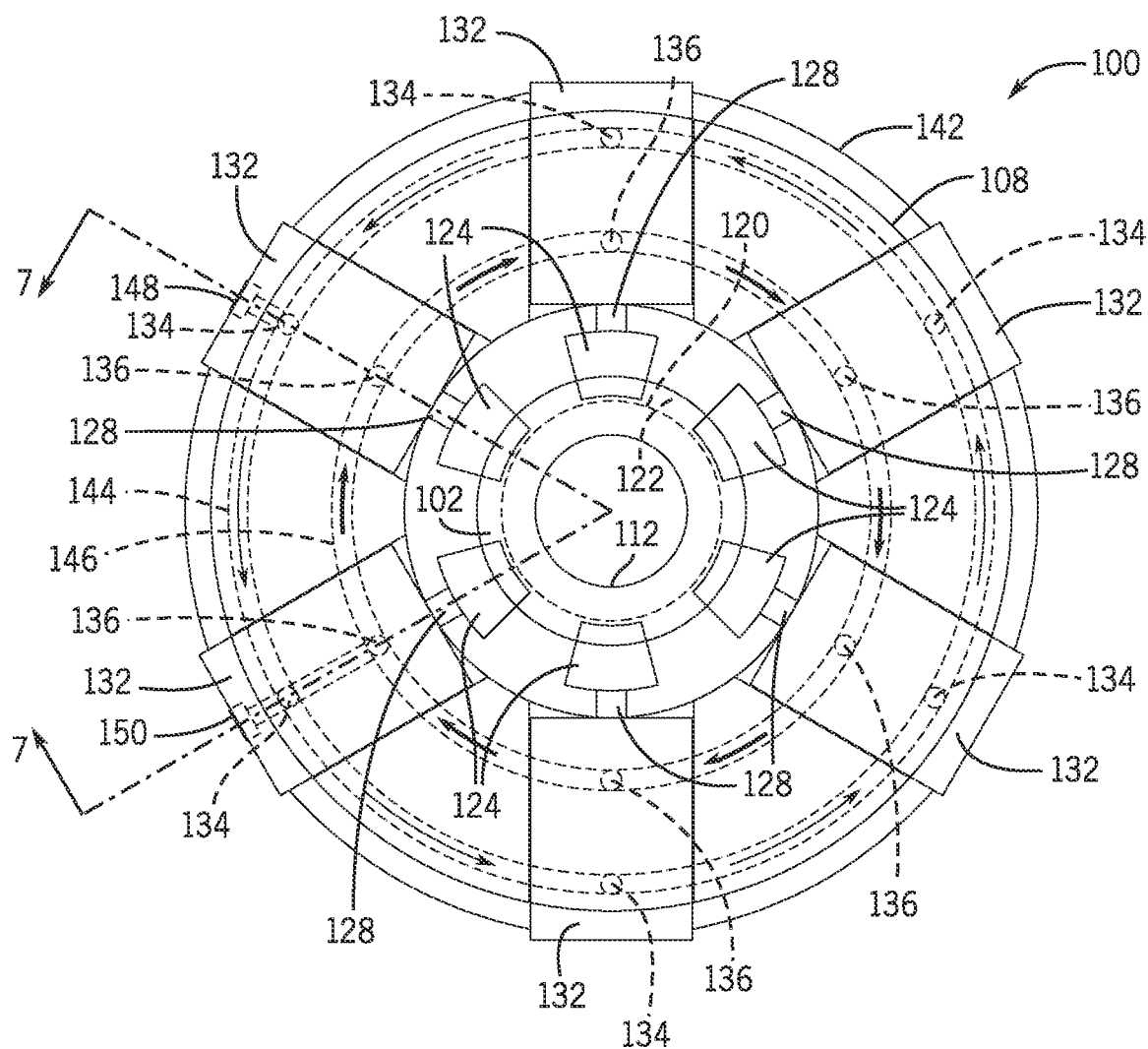
FIG. 8 is a schematic representation showing an arrangement of fluid passages of a pressure gallery ring for routing control fluid to the actuation cylinders of the quick connector of FIGS. 6 and 7 in accordance with one embodiment.

In some other embodiments, quick connectors 54 may be provided with locking segments driven into recesses to secure fluid conduits 48 to other equipment. In FIGS. 6-8, for example, a quick connector 100 includes a receiving structure 104 (e.g., a receptacle or box end) for receiving an end (e.g., pin end) of the fluid conduit 48. The end of the fluid conduit 48 can be a rigid end (e.g., a mandrel 102 attached to a flexible pipe 50) received in a housing 108 of the receiving structure 104. This housing 108 can be connected to other equipment (e.g., a fracturing tree 20 or fracturing manifold 22) via a flange 106 and connecting body 110 of the receiving structure 104. The housing 108 may be coupled to the connecting body 110 via threads or in any other suitable manner. With the mandrel 102 received in the receiving structure 104, fracturing fluid (or other fluid) can be routed between their respective bores 112 and 114.

Although the connector 100 could be arranged with seals between the mandrel 102 and the receiving structure 104 (like in the connector 60 of FIGS. 4 and 5), the connector 100 is shown in FIGS. 6 and 7 as having a sub 116 with seals that seal against the mandrel 102 and the receiving structure 104 to inhibit leakage of fluid from the bores 112 and 114 at the connector 100. This sealing sub 116 could be installed in the mandrel 102, such as with a retaining ring, prior to inserting the mandrel 102 into the housing 108. In other instances, the sealing sub 116 could be placed in the receiving structure 104 before inserting the mandrel 102.

The end of the fluid conduit 48 (e.g., the mandrel 102) received in the housing 108 includes a recess 120 defining a shoulder 122. Locking segments 124 of the connector 100 may be selectively moved between unlocked (FIG. 6) and locked (FIG. 7) states to secure the end of the fluid conduit 48 in the housing 108. In one embodiment, the recess 120 is an annular groove in the exterior of the mandrel 102. In other instances, however, the mandrel 102 may include multiple recesses 120 for receiving the locking segments 124. When moved to the locked position in a recess 120, a locking segment 124 bearing against the shoulder 122 secures the fluid conduit 48 to other equipment (e.g., a wellhead assembly or fracturing manifold) via the connecting body 110.

In FIGS. 6 and 7, the quick connector 100 is depicted having actuation cylinders 132 for driving the locking segments 124 between the unlocked and locked positions. More specifically, the locking segments 124 are coupled to piston rods 128 driven by pistons 130 of the cylinders 132. Control fluid (e.g., hydraulic fluid) can be pumped into each cylinder 132 through a lock port 134 to actuate the pistons 130 and drive the locking segments 124 radially inward toward the locked position to secure the end of the fluid conduit 48 in the housing 108. Similarly, control fluid can be pumped into each cylinder 132 through an unlock port 136 to move the locking segments 124 radially outward to release the fluid conduit 48 from the connector 100. Tail rods 138 of the cylinders 132 generally provide a visual indication of the position of the locking segments 124 during installation and whether the connector 100 is in a locked or unlocked state. The cylinders 132 may be installed in the housing 108 in any suitable manner. In FIGS. 6 and 7, for example, the cylinders 132 are screwed into the housing 108 via a threaded interface 140.

While separate lines (e.g., hoses) could be connected to each cylinder 132 to provide control fluid and actuate the pistons 130, in at least some embodiments control fluid may be routed to each cylinder 132 via a shared interface. As depicted in FIGS. 6-8, for example, the connector 100 includes a pressure gallery ring 142 for routing control fluid to and from the cylinders 132. More specifically, as best shown in the schematic representation of FIG. 8, the pressure gallery ring 142 includes a lock groove 144 and an unlock groove 146 in fluid communication with the lock ports 134 and unlock ports 136, respectively, of the cylinders 132. The lock groove 144 and unlock groove 146 are isolated from one another via one or more seals, such as one or more concentric o-rings between the grooves 144 and 146.

To connect a fluid conduit 48 via the connector 100, the locking segments 124 can be moved from the unlocked position to the locked position by routing control fluid through the shared lock groove 144 of the pressure gallery ring 142 into the cylinders 132 through lock ports 134. And to release the fluid conduit 48, control fluid may be routed into the cylinders 132 through their unlock ports 136 from the shared unlock groove 146 to retract the locking segments 124 from the recess 120. The pressure gallery ring 142 is shown in FIG. 8 as having an external lock port 148 in fluid communication with the lock groove 144 and an external unlock port 150 in fluid communication with the unlock groove 146. Control fluid can be routed into and out of the pressure gallery ring 142 via hoses or other lines connected to the external ports 148 and 150. Additionally, while the schematic view of FIG. 8 generally depicts six cylinders 132 and locking segments 124, any other suitable numbers of cylinders and locking segments may be used in other embodiments.

Another embodiment of a quick connector 100 is depicted in FIGS. 9 and 10. This connector 100 is like that of FIGS. 6-8, with actuation cylinders 132 for driving locking segments 124 between the unlocked (FIG. 9) and locked (FIG. 10) positions for securing an end of a fluid conduit 48. But in contrast to FIGS. 6-8, the cylinders 132 of FIGS. 9 and 10 are secured in the housing 108 via fasteners 154 (e.g., bolts) and include springs 156 that bias the pistons 130 and locking segments 124 toward the locked position. In the event of pressure loss in the cylinders 132, the springs 156 may push the locking segments 124 to the locked position (i.e., the connector 100 may be a fail-secure connector). Such biasing springs 156 could be used in other embodiments. Further, the locking segments 124 can have any suitable shape and size. While the locking segments 124 in FIGS. 6 and 7 have angled noses to engage one or more angled shoulders 122 on the fluid conduit 48, the locking segments 124 in FIGS. 9 and 10 have a generally rectangular cross-section for engaging one or more flat load shoulders 122. FIGS. 9 and 10 also show a pressure gallery ring 142 fastened to the end of the housing 108, with lock port 148 and unlock port 150 arranged axially (parallel to the flow axis through the connector 100) rather than in the radial arrangement shown in FIGS. 6-8.

Figure 11:
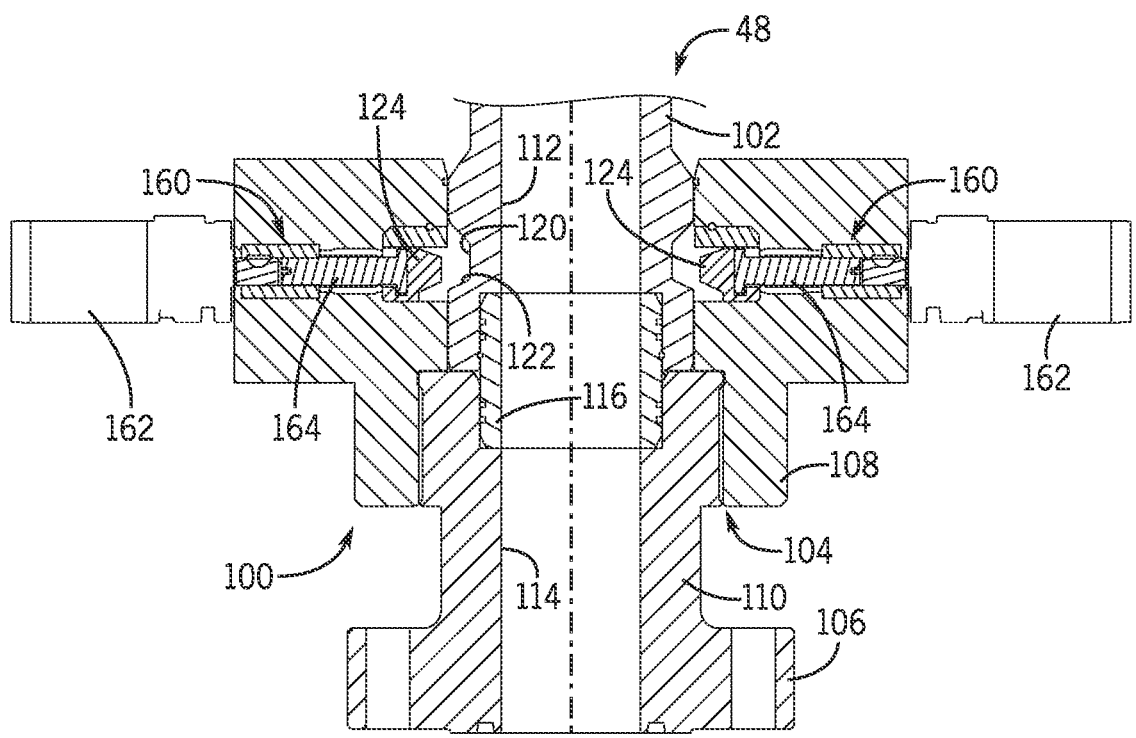
FIG. 11 is a section view of a quick connector in an unlocked state having locking segments driven by pin assemblies in accordance with one embodiment.
Figure 12:
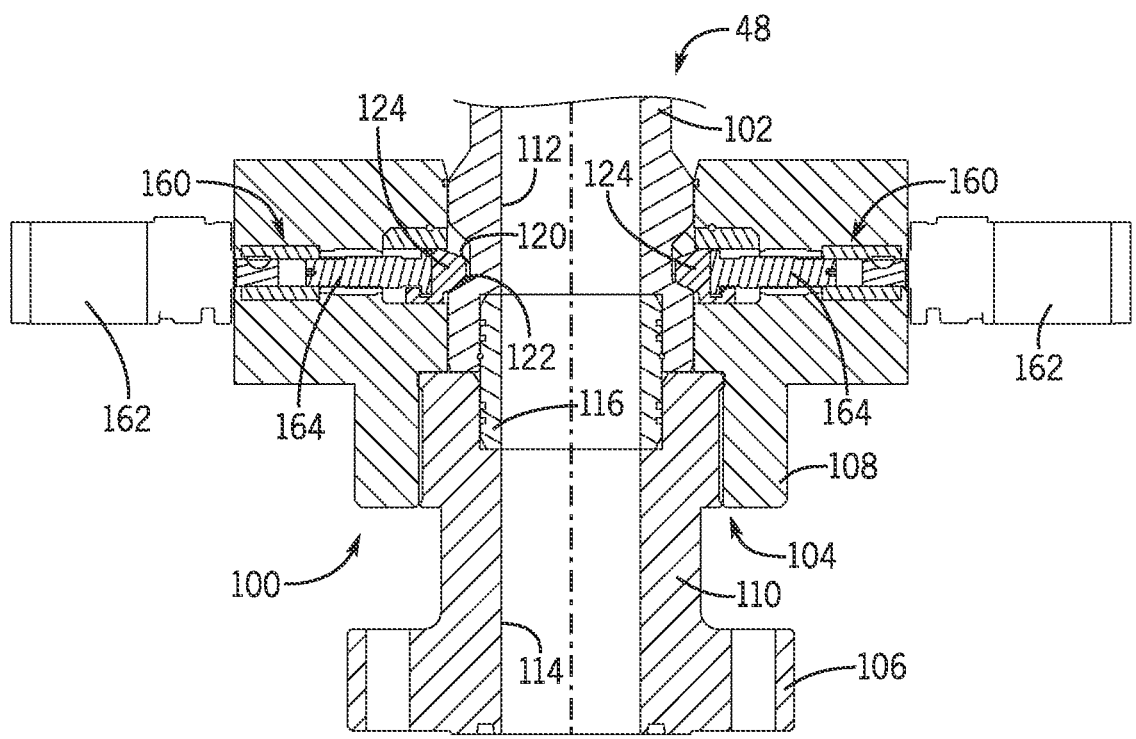
FIG. 12 is a section view of the quick connector of FIG. 11 in a locked state.
Figure 13:
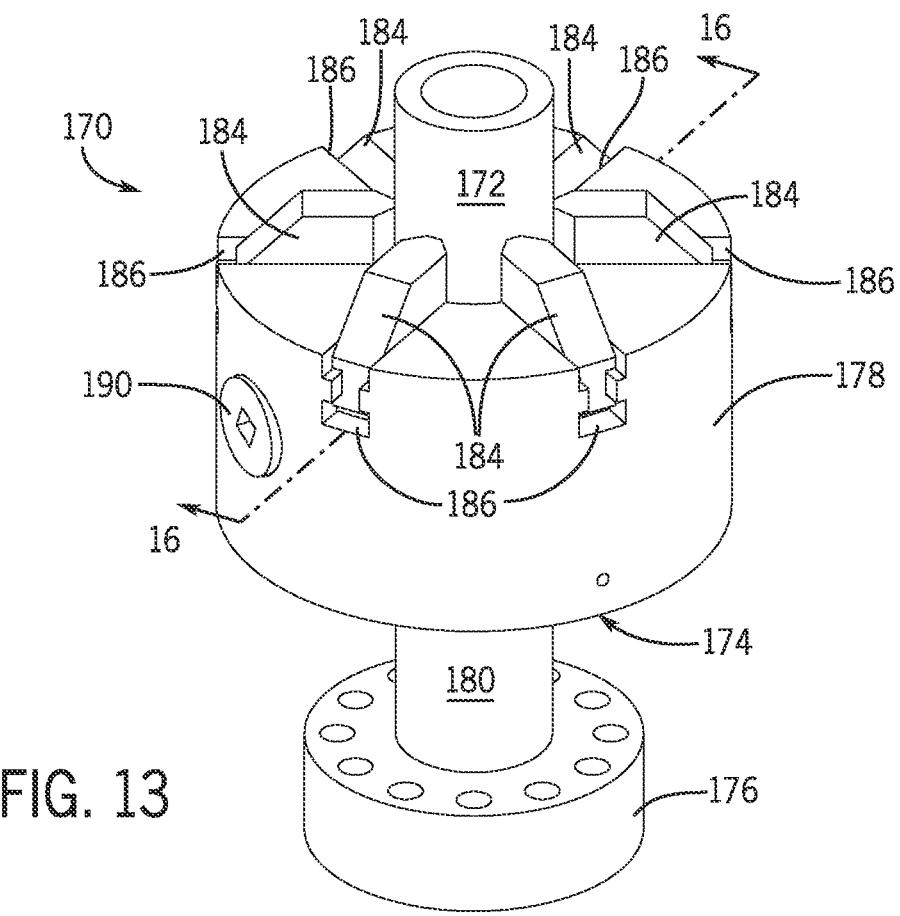
FIG. 13 is a perspective view of a quick connector having jaws for securing an end of a fluid conduit in accordance with one embodiment.
Figure 14:
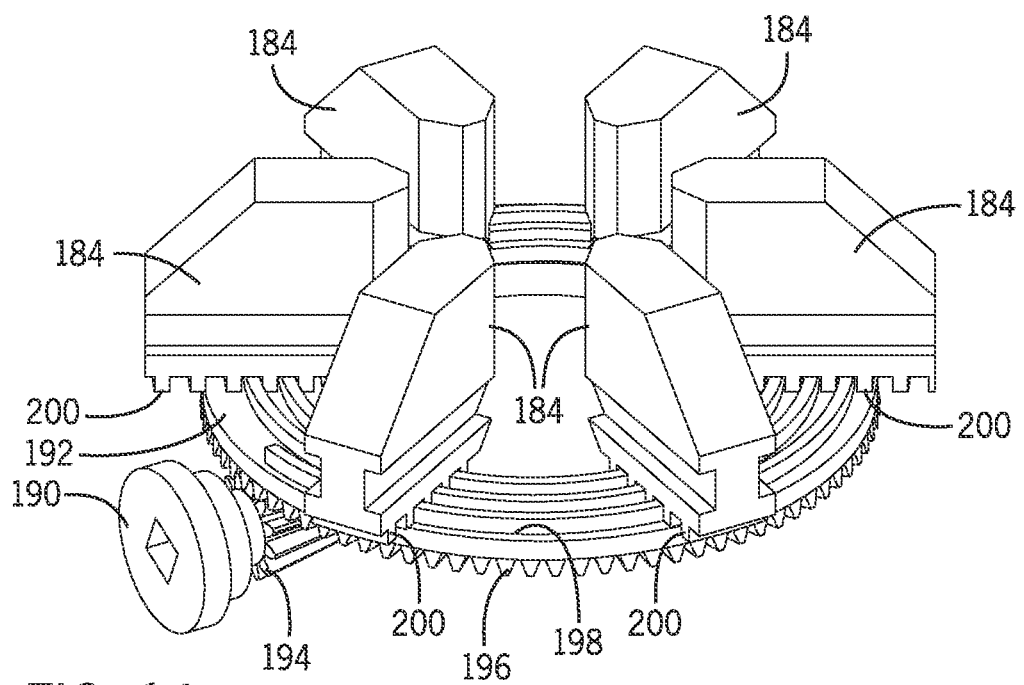
FIG. 14 is a perspective view of the jaws and an actuation assembly of the quick connector of FIG. 13, the actuation assembly including a drive gear and a scroll plate, in accordance with one embodiment.

In other embodiments, the quick connector 100 can be actuated without cylinders. For example, the connector 100 is depicted in FIGS. 11 and 12 as having pin assemblies 160 mounted in the housing 108. The pin assemblies 160 include pins 164 (e.g., leadscrews) connected to locking segments 124, which are radially driven between unlocked (FIG. 11) and locked (FIG. 12) positions by motors 162. Although the motors 162 are hydraulic motors in at least one embodiment, other motors (e.g., electric or pneumatic motors) could be used to drive the pins 164 and locking segments 124 between unlocked and locked positions. The number and arrangement of pin assemblies 160 and motors 162 may vary between embodiments. The shapes of the locking segments 124 and the recess 120 may also vary (e.g., the locking segments 124 and recess 120 could have flat sides, as in FIGS. 9 and 10). And the depicted embodiment may also be a fail-secure connector that secures the end of the fluid conduit 48 in the housing 108 with the locking segments 124 if power (e.g., hydraulic or electrical power) is lost.

In still further embodiments, one or more quick connectors 54 may be provided in the form of a chuck connector for connecting a fluid conduit 48 with other equipment (e.g., a flexible pipe 50 with a fracturing manifold 22 or wellhead assembly). By way of example, a chuck connector 170 is shown in FIGS. 13-16. In this depicted embodiment, the connector 170 includes a receiving structure 174 (e.g., a receptacle or box end) for receiving an end (e.g., pin end) of the fluid conduit 48. As with other examples above, the end of the fluid conduit 48 can be a rigid end (e.g., a mandrel 172) received in a housing 178 of the receiving structure 174, and the housing 178 can be connected to other equipment via a flange 176 and connecting body 180 of the receiving structure 174. The housing 178 and connection body 180 can be connected together in any suitable manner. In some embodiments, for example, the housing 178 may have multiple pieces that are assembled about the connection body 180. In other embodiments, the connection body 180 may be formed of multiple pieces to facilitate installation (e.g., the flange 176 may be threaded or welded onto the connection body 180 after the housing 178 is positioned about the connection body 180).

The connector 170 also includes one or more jaws 184 each mounted in a corresponding slot 186 of the housing 178. The jaws 184 can be moved radially between locked (FIG. 15) and unlocked (FIG. 16) positions to secure the end of a fluid conduit 48 (e.g., the mandrel 172) in the connector 170. Although the jaws 184 could be driven in any suitable manner, in some embodiments the jaws 184 are actuated through rotation of at least one gear. In the embodiment depicted in FIGS. 13-16, for instance, a gear 190 may be driven (e.g., by an electric or hydraulic motor 220, or manually with a tool) to rotate a scroll plate 192 and drive the jaws 184 between the locked and unlocked positions. More specifically, upon rotation of the drive gear 190, torque is transmitted by teeth 194 of the gear 190 to mating teeth 196 of the scroll plate 192, causing the scroll plate 192 to also rotate. The scroll plate 192 includes a spiral tooth 198 that engages mating teeth 200 of the jaws 184. With the jaws 184 installed in the slots 186, and through interaction of the spiral tooth 198 of the scroll plate 192 with the teeth 200 of the jaws 184, rotation of the scroll plate 192 in one direction drives the jaws 184 radially inward toward the locked position, while rotation of the scroll plate 192 in the opposite direction drives the jaws 184 radially outward toward the unlocked position. The positions of the jaws 184 may be used as a visual indication of whether the connector 170 is in a locked or unlocked state.

Figure 15:
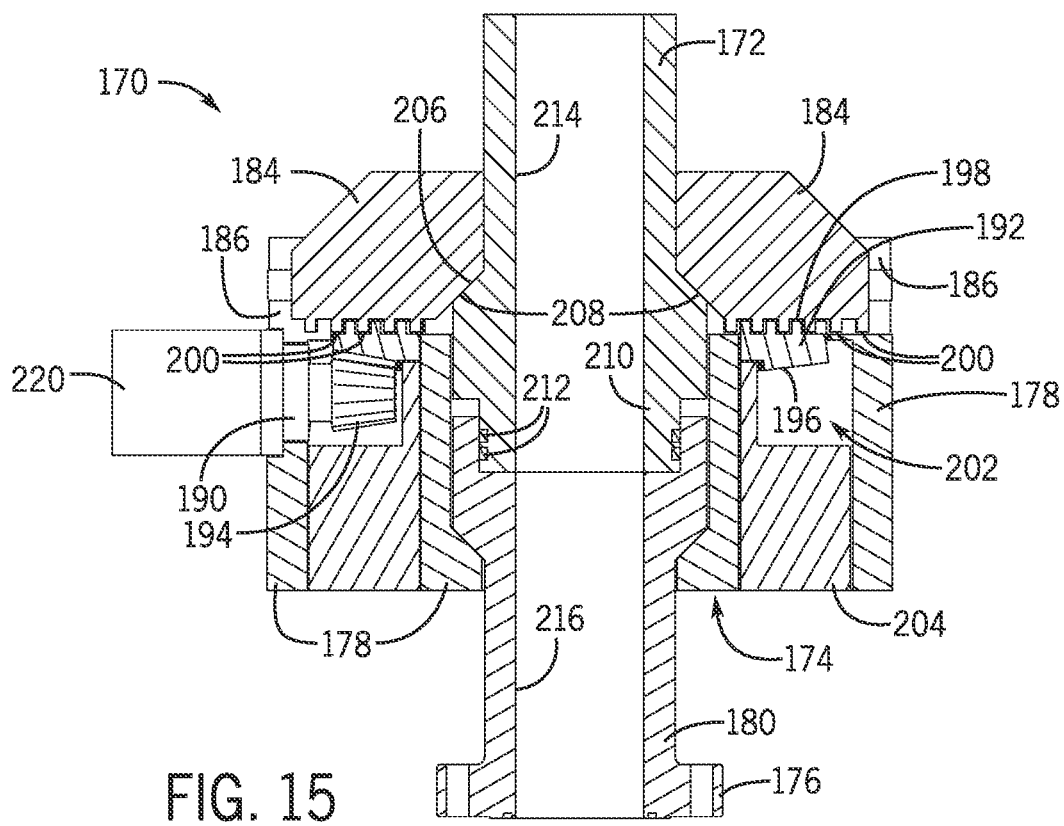
FIG. 15 is a section view of the quick connector of FIGS. 13 and 14 in a locked state in accordance with one embodiment.
Figure 16:
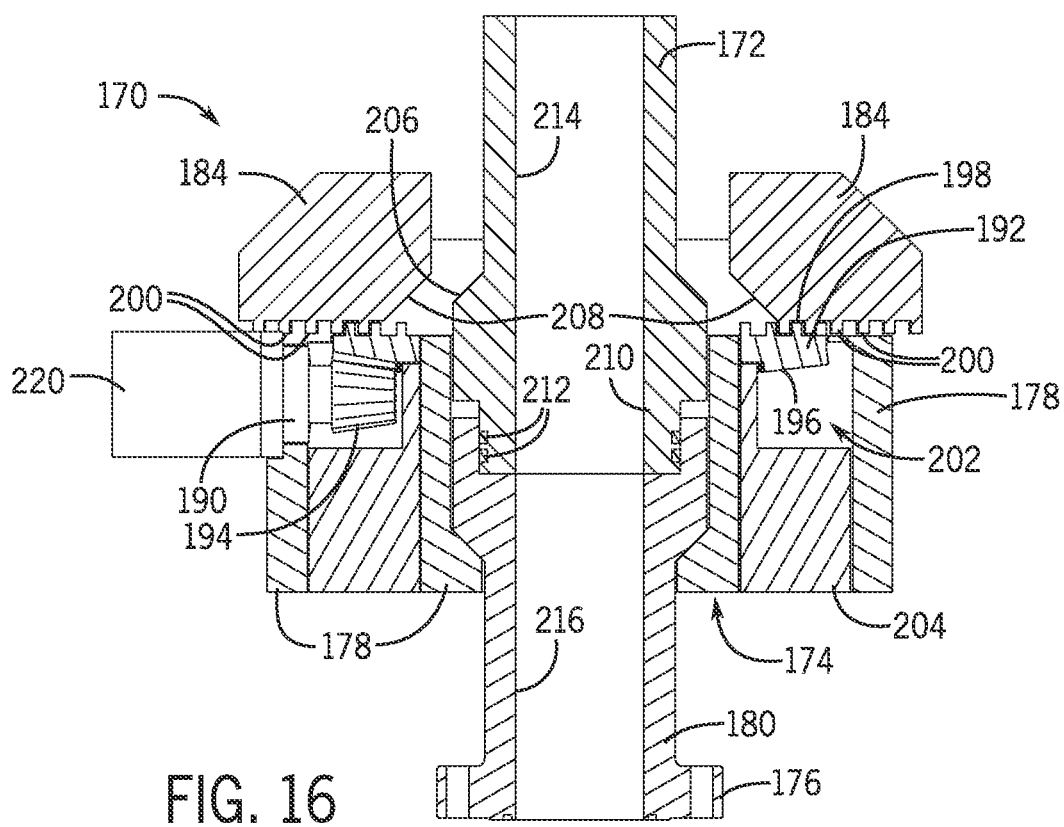
FIG. 16 is a section view of the quick connector of FIGS. 13-15 in an unlocked state.

As shown in FIGS. 15 and 16, the scroll plate 192 is received in an annular cavity 202 within the housing 178 and retained with a retaining ring 204, which may be threaded or pinned in the housing 178. As also shown in these two figures, the jaws 184 can be driven over a shoulder 206 of the mandrel 172 to secure a fluid conduit 48 in the connector 170. The shoulder 206 may be provided as a tapered shoulder engaged by mating tapered surfaces 208 of the closed jaws 184 in some instances, though other configurations of jaws 184 and shoulder 206 could be used.

The mandrel 172 of FIGS. 15 and 16 is depicted as having a neck 210 received in a socket of the connecting body 180, with seals 212 inhibiting leakage from bores 214 and 216 of the mandrel 172 and connector 170. Other embodiments, however, may use seals 212 with a sealing sub or some other sealing arrangement. And as with other seals described above, the seals 212 can be elastomer or metal seals.

Figure 17:
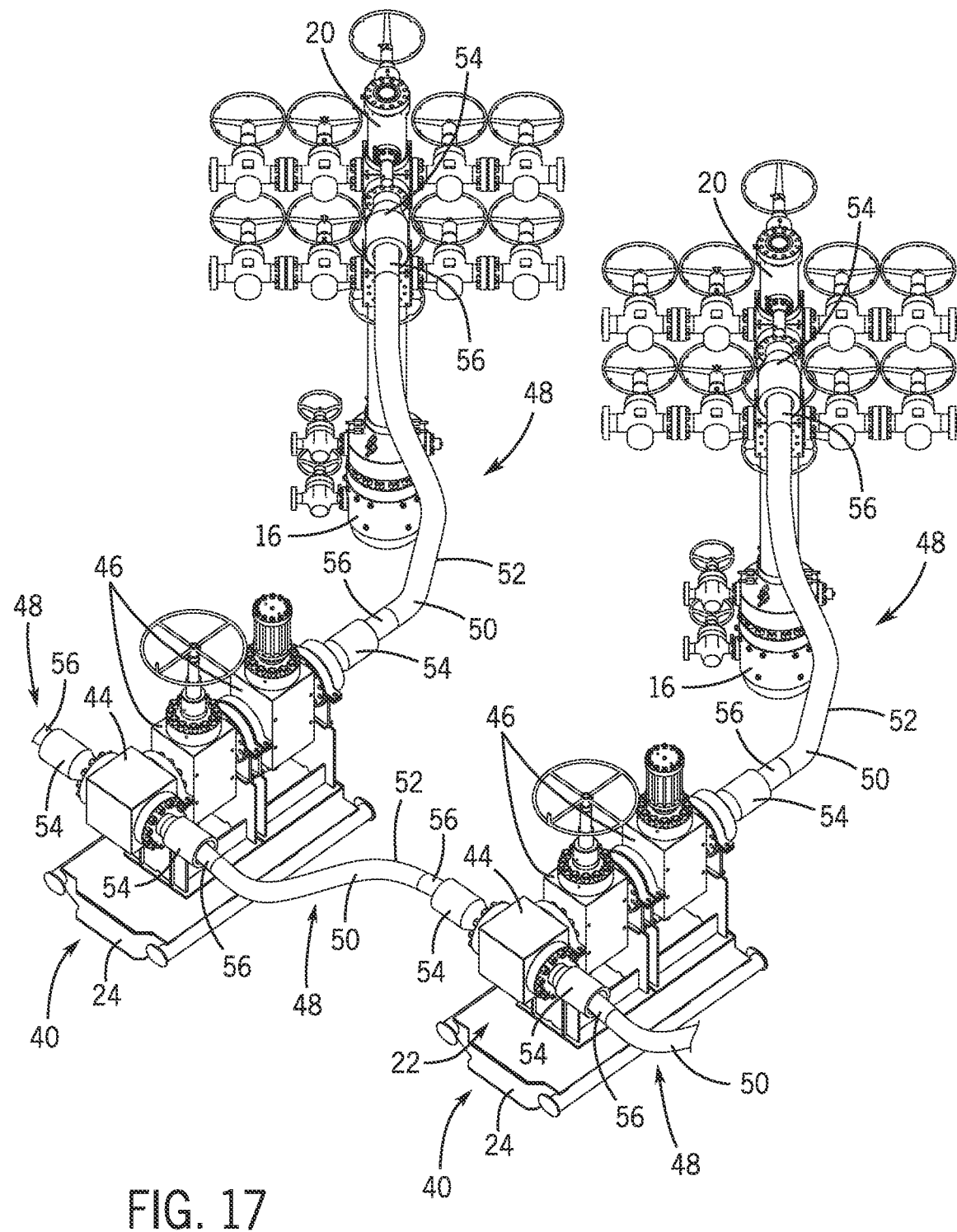
FIG. 17 is a perspective view of certain components of a fracturing system, including portions of a fracturing manifold mounted on skids and joined to fracturing trees and to each other with fracturing fluid conduits and quick connectors, in accordance with one embodiment.

While the various quick connectors described above may be used to connect fracturing fluid conduits 48 to a fracturing manifold 22 and to wellhead assemblies (e.g., to fracturing trees 20), it will be appreciated that these quick connectors could be used in other manners. In FIG. 17, for example, the fracturing manifold 22 includes skid assemblies 40 with flow control assemblies (e.g., connection blocks 44 and valves 46) connected in fluid communication with each other through one or more fluid conduits 48 connected to the skid assemblies 40 with quick connectors 54. Fluid conduits 48 with quick connectors 54 could also be used elsewhere, such as to connect a missile trailer to an instrumentation skid or to the manifold 22, or to connect an instrumentation skid to the manifold 22, for instance. The fluid conduits 48 and quick connectors 54 can take any suitable forms, such as those described above. In some embodiments, the trunk line of the fracturing manifold 22 includes one or more flexible fluid conduits 48 connected between skid assemblies 40. In FIG. 17, for example, a fluid conduit 48 connecting the skid assemblies 40 is depicted in the form of a flexible pipe 50; this is in contrast to the rigid pipe 42 of the manifold trunk line depicted in FIG. 3. Additionally, in some instances fracturing fluid conduits 48 may be provided as rigid fluid lines, rather than flexible pipes 50, that can be connected to equipment (e.g., fracturing trees 20, fracturing manifold 22, or other equipment) via the quick connectors described above.

The conduits 48 and the fracturing fluid delivery systems described above can be constructed for various operating pressures and with different bore sizes depending on the intended application. In some embodiments, the fluid conduits 48 are constructed for rated maximum operating pressures of 10-15 ksi (approximately 69-103 MPa). Further, the conduits 48 of some embodiments have bores between four and eight inches (approx. 10 and 20 cm) in diameter, such as bores having a five- or five-and-one-eighth-inch (approx. 13 cm) diameter or a seven-inch (approx. 18 cm) diameter.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fracturing system comprising:
   a wellhead assembly; and
   a fracturing fluid conduit coupled to the wellhead assembly to enable receipt of fracturing fluid by the wellhead assembly from the fracturing fluid conduit, the fracturing fluid conduit including a flexible body defining a bore for conveying the fracturing fluid to the wellhead assembly, wherein the fracturing fluid conduit is coupled to the wellhead assembly via an actuated connector including one or more locking members that move from an unlocked position to a locked position to secure the fracturing fluid conduit to the wellhead assembly, and wherein the actuated connector includes a chuck connector having a scroll plate and having the one or more locking members in the form of jaws driven radially between the unlocked position and the locked position by the scroll plate.

2. The fracturing system of claim 1, wherein an end of the fracturing fluid conduit includes a mandrel having a shoulder engaged by at least one of the one or more locking members in the locked position to secure the fracturing fluid conduit to the wellhead assembly.

3. The fracturing system of claim 1, comprising a motor coupled to drive the jaws via the scroll plate.

4. The fracturing system of claim 1, wherein the fracturing fluid conduit includes a pin end that is received in a box end of the wellhead assembly and the one or more locking members are housed in the box end so as to secure the fracturing fluid conduit to the wellhead assembly by moving the one or more locking members radially inward from the unlocked position to the locked position.

5. The fracturing system of claim 1, comprising a fracturing manifold coupled to the wellhead assembly via the fracturing fluid conduit.

6. The fracturing system of claim 5, wherein the fracturing fluid conduit is coupled to the fracturing manifold via an additional actuated connector including one or more locking members that move from an unlocked position to a locked position to secure the fracturing fluid conduit to the fracturing manifold.

7. The fracturing system of claim 6, wherein the fracturing fluid conduit includes a first end connected to the wellhead assembly by the actuated connector and a second end connected to the fracturing manifold by the additional actuated connector, and the fracturing fluid conduit is without a flanged connection or a hammer union between the first end and the second end.

8. The fracturing system of claim 1, wherein the wellhead assembly includes a fracturing tree and the fracturing fluid conduit is coupled to the fracturing tree via the actuated connector.

9. A method comprising:
   moving a first end of a flexible fracturing fluid conduit toward a wellhead assembly; and
   actuating a connector to move one or more locking members of the connector from an unlocked position to a locked position to secure the first end of the flexible fracturing fluid conduit to the wellhead assembly via the connector, wherein actuating the connector includes actuating a chuck connector having a scroll plate and having the one or more locking members in the form of jaws driven radially between the unlocked position and the locked position by the scroll plate.

10. The method of claim 9, comprising:
    moving a second end of the flexible fracturing fluid conduit toward a fracturing manifold; and
    actuating an additional connector to move one or more locking members of the additional connector from an unlocked position to a locked position to secure the second end of the flexible fracturing fluid conduit to the fracturing manifold via the additional connector.

11. The method of claim 9, comprising performing a fracturing operation including pumping fracturing fluid into a well through the flexible fracturing fluid conduit and the wellhead assembly.

12. The method of claim 11, comprising performing the fracturing operation such that all fracturing fluid pumped into the well during the fracturing operation passes through the flexible fracturing fluid conduit.

* * * * *